United States Patent [19]

Morgan

[11] Patent Number: 5,400,549
[45] Date of Patent: Mar. 28, 1995

[54] INSULATED REMOVABLE POND COVER

[76] Inventor: William D. Morgan, 6009 Chapel Dr., Minneapolis, Minn. 55439

[21] Appl. No.: 139,835

[22] Filed: Oct. 22, 1993

[51] Int. Cl.⁶ .............................................. E04B 7/00
[52] U.S. Cl. ............................................ 52/23; 52/5; 4/498; 160/231.1
[58] Field of Search ....................... 52/23, 5, 408, 409; 4/498, 503; 160/84.1 E, 231.1

[56] References Cited

U.S. PATENT DOCUMENTS

| | | | |
|---|---|---|---|
| 2,952,024 | 9/1960 | Bartolucci | 4/503 |
| 3,683,428 | 8/1972 | Morris | 4/498 |
| 3,862,876 | 1/1975 | Graves | 52/23 X |
| 4,135,257 | 1/1979 | Löf | 4/498 |
| 4,137,575 | 2/1979 | Klaffke et al. | 4/498 |
| 4,169,050 | 9/1979 | Serfling et al. | 210/12 |
| 4,192,025 | 3/1980 | Hinsperger | 4/498 |
| 5,067,182 | 11/1991 | Koelsch | 4/498 |

FOREIGN PATENT DOCUMENTS 2004656  8/1971  Germany .................................. 4/498

Primary Examiner—Carl D. Friedman
Assistant Examiner—Kien Nguyen
Attorney, Agent, or Firm—Thomas B. Tate

[57] ABSTRACT

An insulated removeable pond cover for settling ponds. The pond cover comprises a plurality of sealed panel units containing insulation. The panel units are linked together by means of a system of cables which pass through grommets in the panel units.

1 Claim, 2 Drawing Sheets

INSULATED REMOVABLE POND COVER

SUMMARY AND BACKGROUND OF THE INVENTION

Man-made, usually rectangular, settling ponds are used for holding sewage and industrial wastes. These ponds are usually covered by a large one-piece geomembrane which has gas and water collection systems and is usually not insulated. These pond covers are laid on-site and secured by an anchoring trench. Because of their size, they are difficult to remove.

The present invention is an insulated removeable pond cover which is made in sections which are held together by means of a series of grommets and cables. The cables are secured to a series of concrete deadheads.

The primary advantage of the invention is that it is removeable, thus allowing the pond to be dredged and re-used. Another advantage is that the insulation results in heat being retained in the pond, thus speeding biodegradation of organic material.

DESCRIPTION OF THE INVENTION

Figure 1:
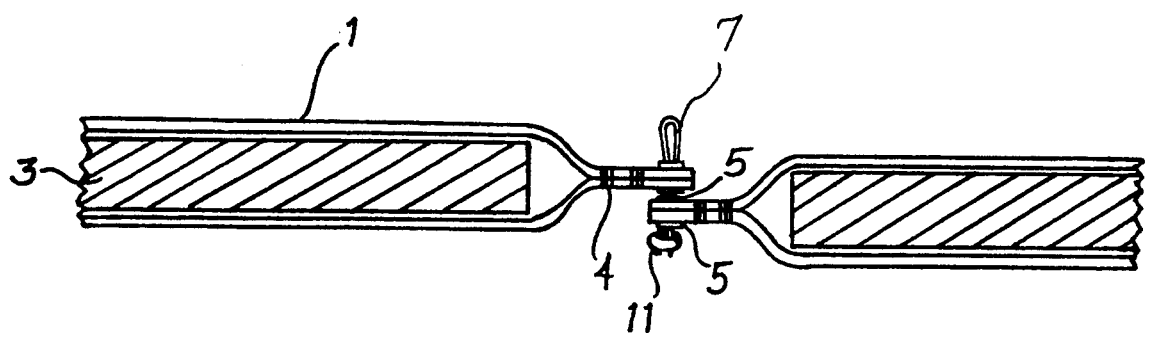
FIG. 1 is a side detail view of two of the panels.
Figure 2:
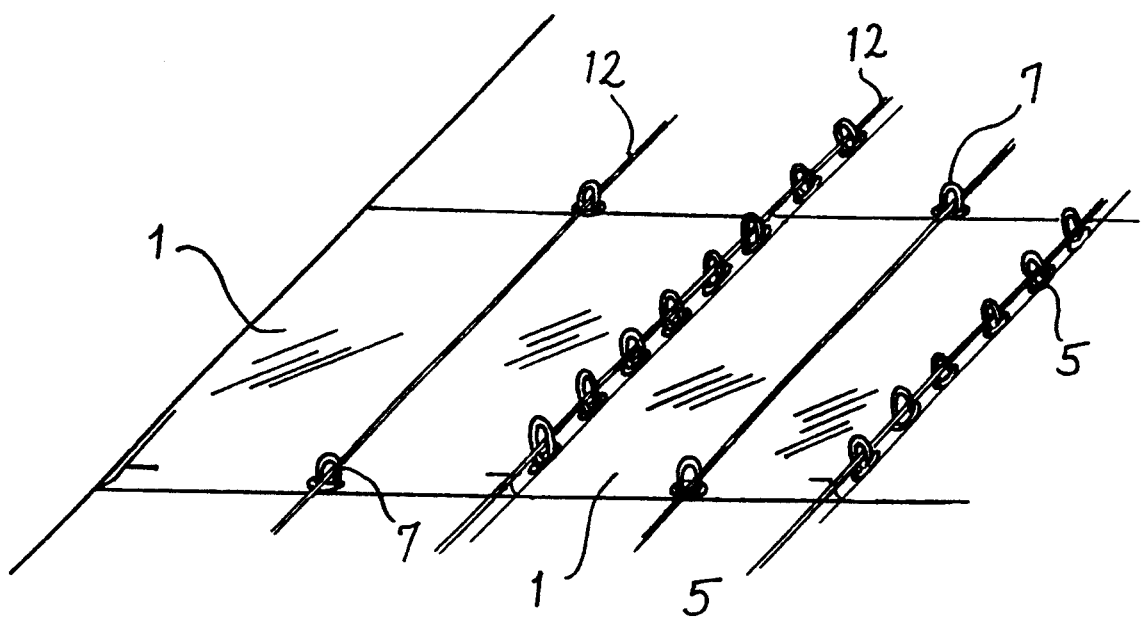
FIG. 2 is a top perspective view showing two full panels and parts of four other panels, starting from one edge of the pond cover on the left.

The pond cover comprises a plurality of generally rectangular casings or panel units 1 linked together. The number and size of the casings 1 will vary depending upon the size of the pond to be covered, and the casings 1 are arranged in as many rows as are needed. Generally each casing 1 will be about seven and one-half feet wide and approximately forty feet long. Each casing 1 is filled with a layer of insulation 3 and then sealed at either end and along either side by a fusion weld 4. The casings 1 are made of geomembrane (a high density polyethylene material).

Adjacent casings 1 are linked together in overlapping spaced relationship by means of a grommet and cable system. Each casing 1 is provided with a plurality of grommets 5 at either end and along either side, positioned outside of the welded area 4 so as not to break the seal. The total number of grommets 5 per casing 1 can vary. After the grommets 5 of adjacent casings 1 are lined up in vertical spaced relationship to each other, a cable 7 is passed through the openings of the grommets 5, is formed into a loop above the panels 1 and is secured in position by a cable clamp 11 attached to the cable 7 beneath the casings 1. A heavy tie-down cable 12 is then passed through all the loops of the cables 7 in the row and is secured at either end to an anchor post such as a concrete deadhead, in a conventional manner such as tying the cable 12 to a rod with a nut at either end and securing the cable 12 with a cable clamp. If wind getting underneath the cover is a problem, additional cables can be passed through the cable loops 7 perpendicular to cable 12 at either end and in the middle of the series of casings 1.

Once the pond cover has been secured in position, it will float upon the liquid in the pond, and it can be removed when the pond needs to be dredged.

I claim:

1. A pond cover comprising a plurality of panel units linked together; means for insulating said pond cover, said insulating means comprising a generally rectangular layer of insulation wherein each of said panel units is filled internally with said layer of insulation and is sealed at either end and along either side by welding;

and means for linking said panel units together and securing said pond cover in position on a pond, said linking means comprising grommets disposed along said sealed end of each of said panel units, and each of said panel units is linked in vertical spaced relationship to an adjacent panel unit by at least one cable disposed through said vertical spaced grommets and formed into a loop projecting above said panel units, and said securing means including a second cable which is disposed through the entire row of said loops and is anchored at either of its end to an anchoring means.

* * * * *